(No Model.) 6 Sheets—Sheet 1.

H. B. ANGELL.
DREDGING MACHINE.

No. 246,362. Patented Aug. 30, 1881.

Witnesses
Geo. H. Strong.
Frank A. Brooks

Inventor
Horace B. Angell
By Dewey & Co.
Att'ys (No Model.) 6 Sheets—Sheet 2.
H. B. ANGELL.
DREDGING MACHINE.
No. 246,362. Patented Aug. 30, 1881.
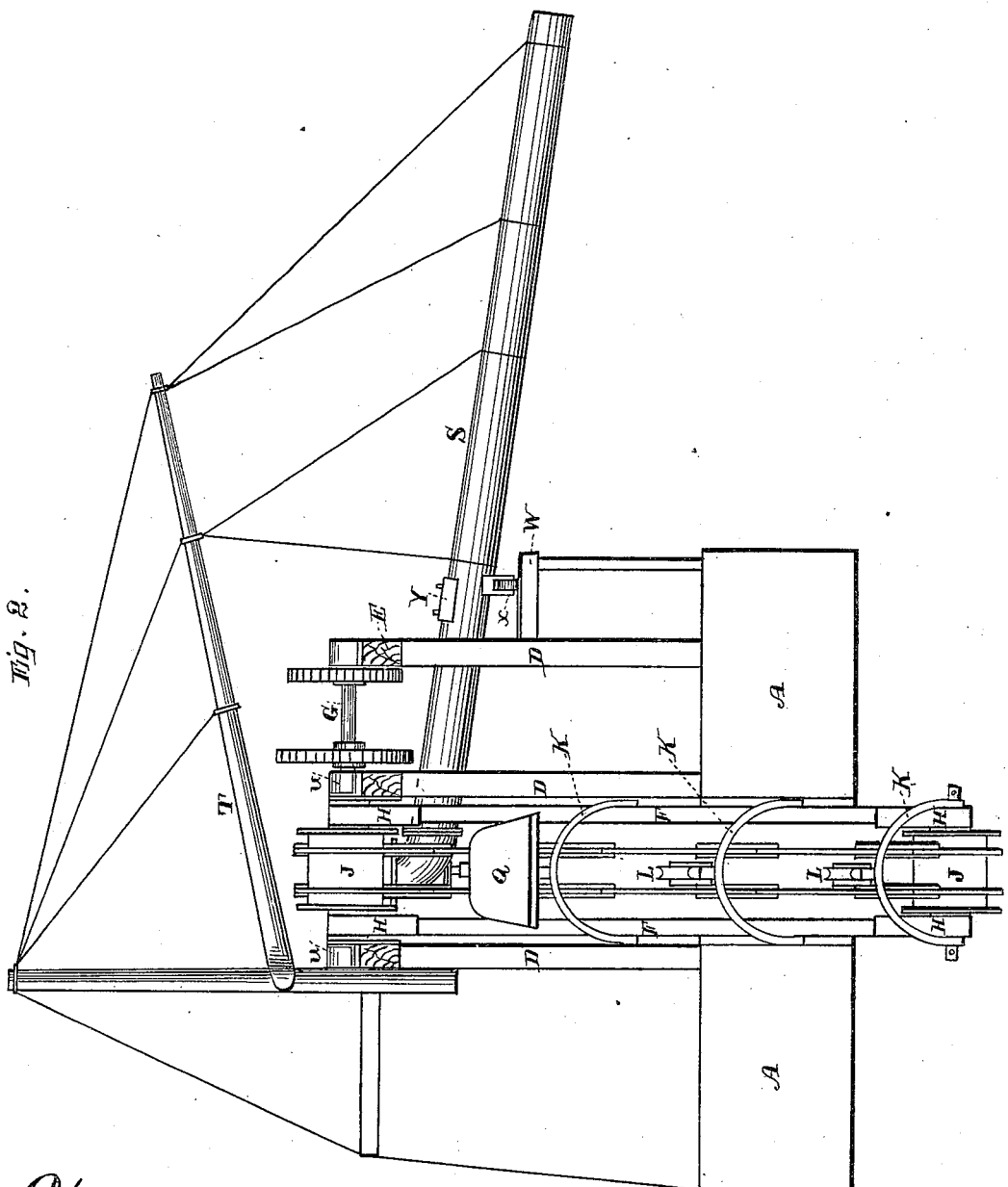
Witnesses
Geo. H. Strong
Frank A. Brooks
Inventor
Horace B. Angell
By Dewey & Co. Attys (No Model.) 6 Sheets—Sheet 3.
H. B. ANGELL.
DREDGING MACHINE.
No. 246,362. Patented Aug. 30, 1881.
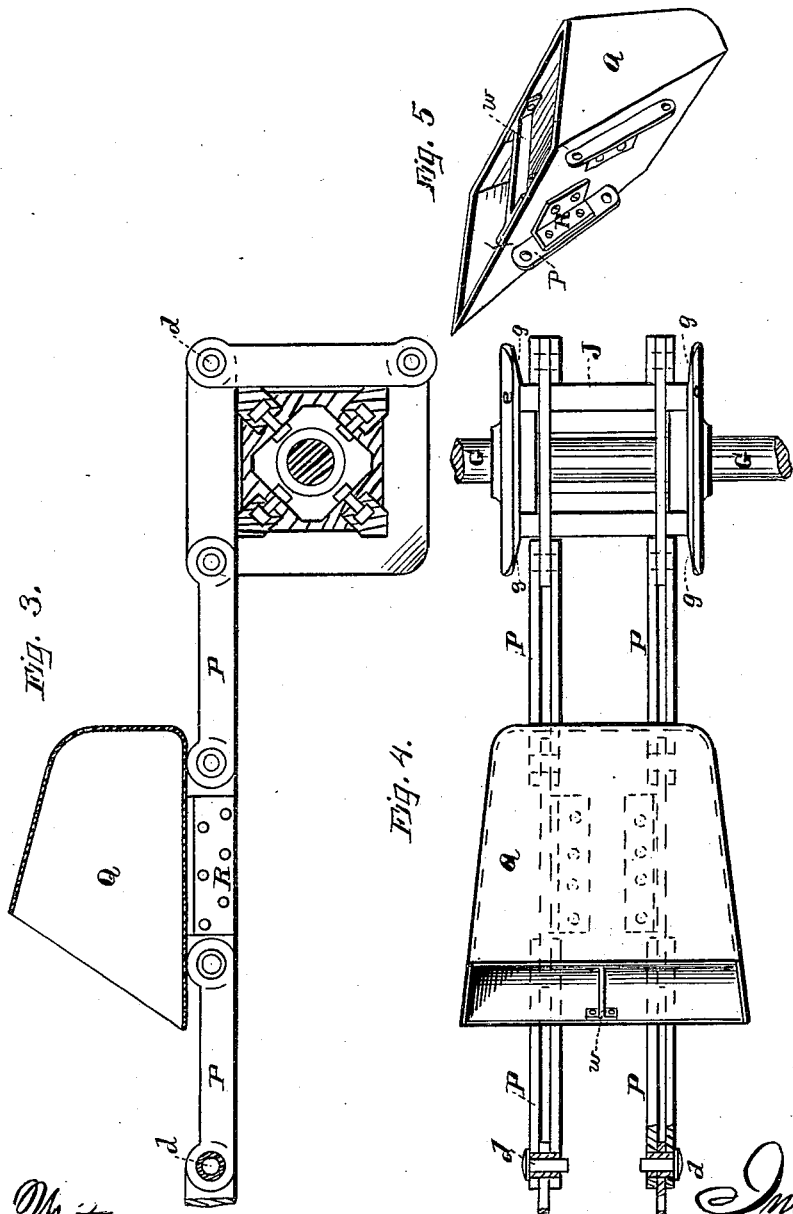
Witnesses
Geo. H. Strong
Frank A. Brooks
Inventor
Horace B. Angell
By Dewey & Co.
Att'ys (No Model.) 6 Sheets—Sheet 4.
H. B. ANGELL.
DREDGING MACHINE.
No. 246,362. Patented Aug. 30, 1881.
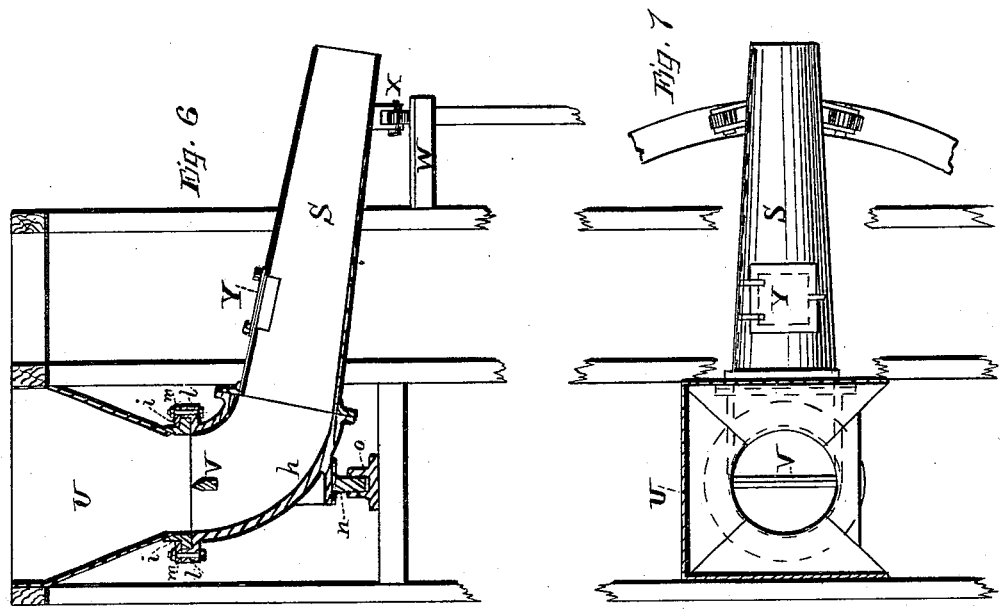
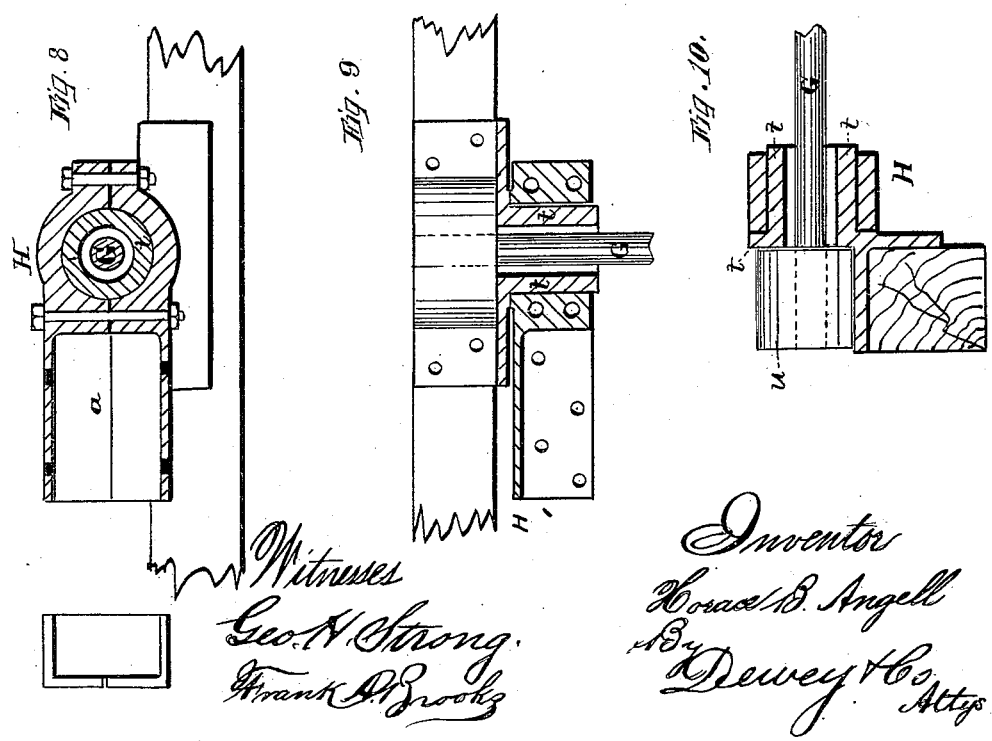
Witnesses
Geo. H. Strong.
Frank D. Brooks.
Inventor
Horace B. Angell
By Dewey & Co.
Attys (No Model.) 6 Sheets—Sheet 5.
H. B. ANGELL.
DREDGING MACHINE.
No. 246,362. Patented Aug. 30, 1881.
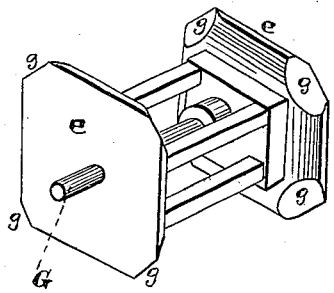
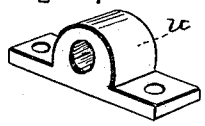
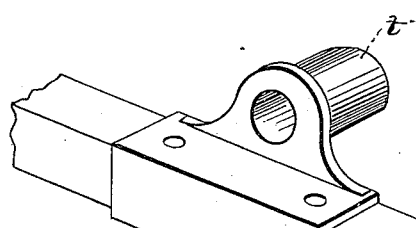
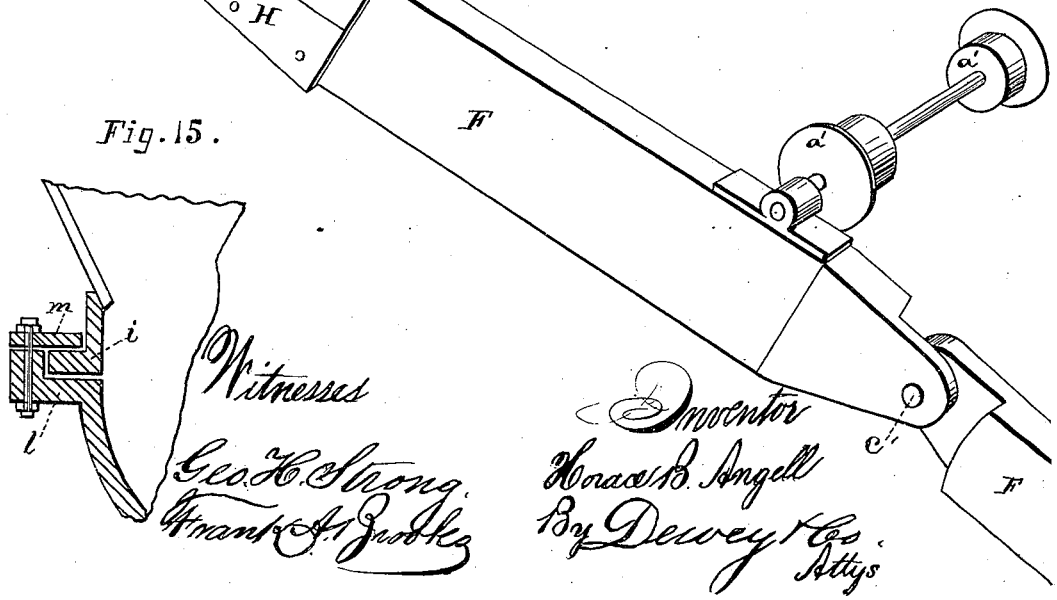
Witnesses
Geo. H. Strong
Frank A. Brooks
Inventor
Horace B. Angell
By Dewey & Co.
Attys (No Model.) 6 Sheets—Sheet 6.

H. B. ANGELL.
DREDGING MACHINE.

No. 246,362. Patented Aug. 30, 1881.

Witnesses
Geo. H. Strong
Frank A. Brooks

Inventor
Horace B. Angell
By Dewey & Co.
Att'ys

UNITED STATES PATENT OFFICE.

HORACE B. ANGELL, OF SAN FRANCISCO, CALIFORNIA.

DREDGING-MACHINE.

SPECIFICATION forming part of Letters Patent No. 246,362, dated August 30, 1881.

Application filed April 30, 1881. (No model.)

*To all whom it may concern:*

Be it known that I, HORACE B. ANGELL, of the city and county of San Francisco, State of California, have invented Improvements in Dredging-Machines; and I hereby declare the following to be a full, clear, and exact description thereof.

My invention relates to the class of dredging-machines, and more especially to certain improvements therein, consisting in peculiarly-constructed irons or nose-pieces for receiving and strengthening the ladder-timbers, said timbers having bails attached thereto at certain intervals, provided with pulleys, over which passes the chain connected with the gipsy or windlass. A peculiar hopper is connected with the elbow of the discharge-pipe by a swivel-joint, said elbow being supported on a pivot-pin in a step below, while the pipe is supported on a turn-table, and has a door or opening for the purpose of introducing water to clean it.

The object of these improvements is to obviate certain difficulties applying to each part particularly, and which will be more fully set forth in the course of the following more minute description of my invention.

Figure 1:
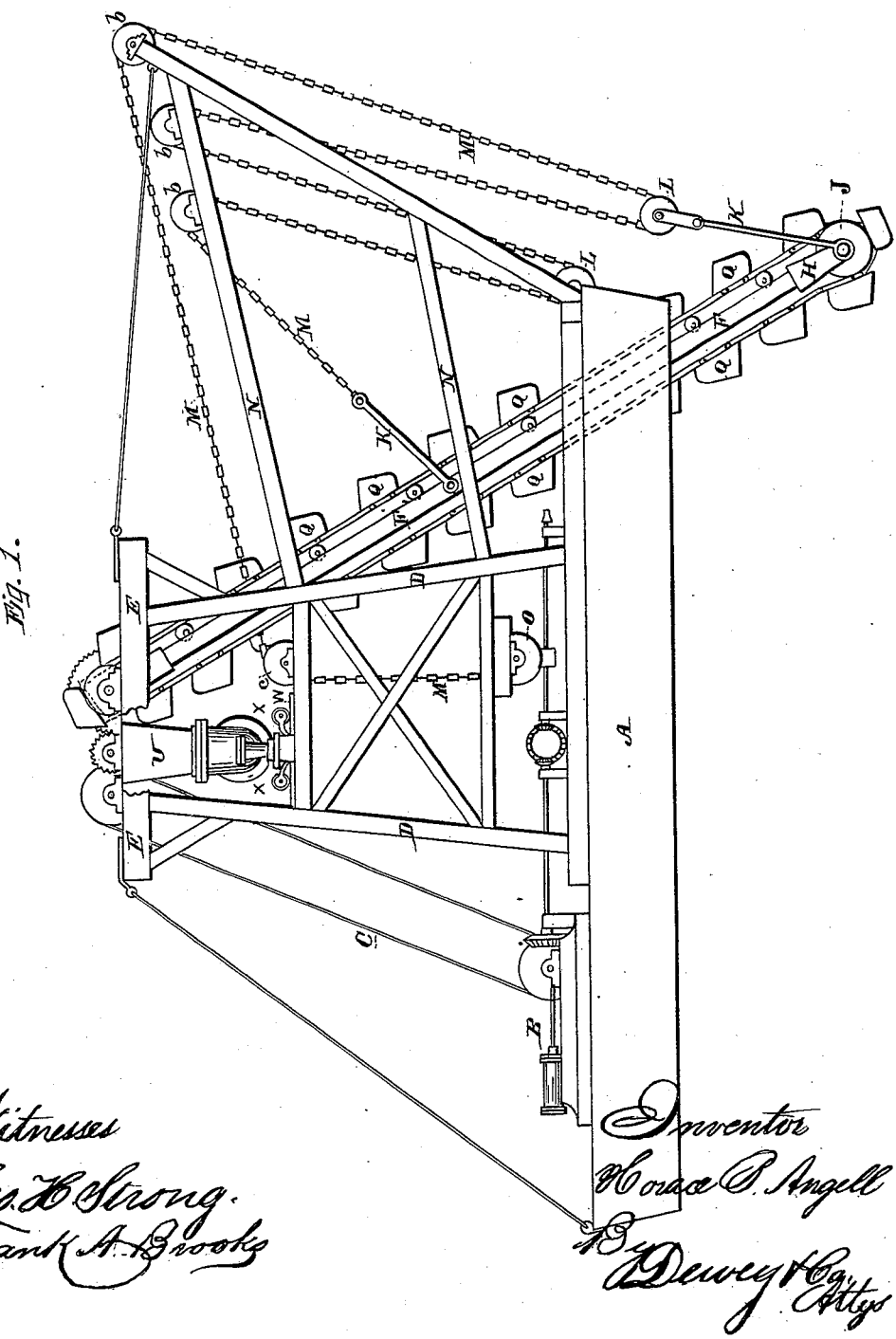
Figure 16:
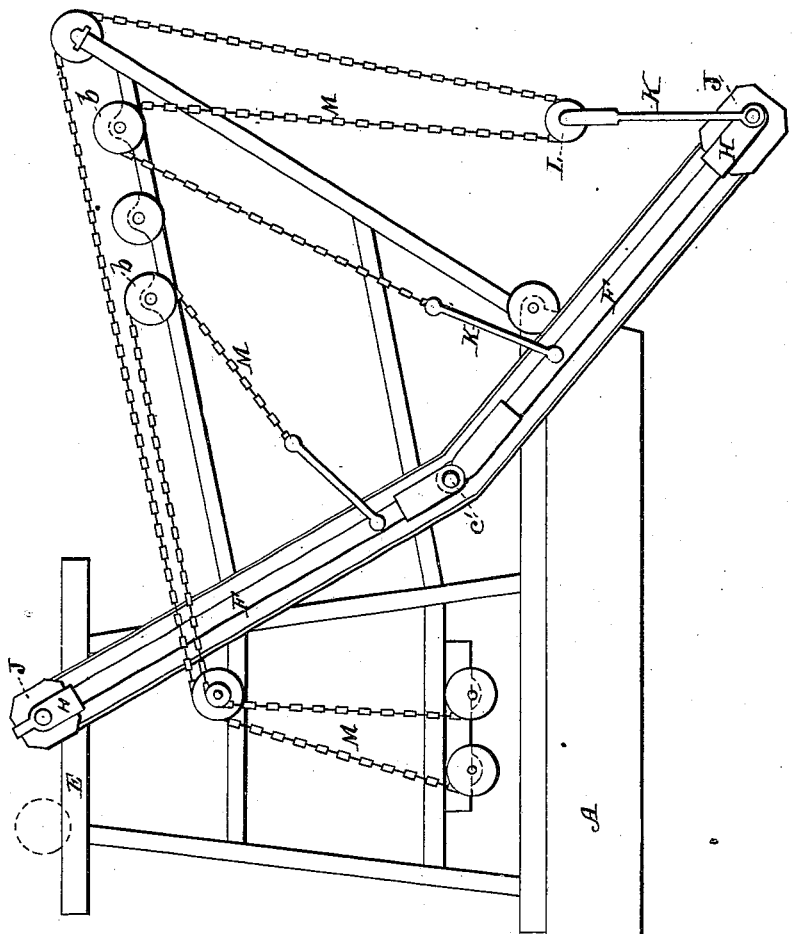

Referring to the accompanying drawings, Figure 1 shows a side view of the dredging-machine. Fig. 2 shows an end view of the same. Figs. 3, 4, and 5 show views of buckets, links, and tumblers. Figs. 6 and 7 show views of hopper and spout. Figs. 8, 9, 10, 11, 12, 13, 14, and 15 show other details of construction. Fig. 16 shows a view of jointed ladder.

In these figures similar letters indicate like parts.

In Fig. 1, A represents a side of the boat, having, as shown in Fig. 2, a longitudinal channel in its center.

B represents the engine or other power, driving by a belt, C, the parts with which it is connected upon top of the vertical frame or support D. I have here shown certain arrangement of pulleys and power mechanism which needs no explanation, as it is accomplished in the usual manner.

E represents timbers on top of the vertical frame D.

F represents the ladder with its side frame-timbers in the usual manner. My first improvement has relation to the end connections of these frame-timbers F.

G is a horizontal shaft, having pulleys, as shown, and journaled in pillow blocks or boxes $u$ upon timbers E, Figs. 2, 14, 10.

H represents the fastening-irons or nose-pieces on the upper and lower ends of the ladder-timbers. Those above fit over the sleeves $t$, which receive the shaft G, as shown, the said shaft being supported by the pillow blocks or boxes $u$, and is smaller than the sleeves, so as not to touch their sides. The shaft is thus relieved from any weight or strain, the whole being supported by the boxes $u$ on the frame-timbers. The upper nose-pieces, H, are secured by bolts about said sleeves, and are made in two longitudinal sections for convenience in fitting said sleeve and the timbers F. Thus the shaft G is allowed to revolve without interference, Figs. 8, 9, 10, 12, and 14. These nose-pieces have, as shown, each an extended socket, $a$, having three inclosing sides, into which the ends of the ladder-timbers fit, and are bolted therein securely. The nose-pieces below are made of a single piece and fit over the shaft of the lower tumbler in an ordinary journal, allowing the revolution of the said shaft, and are securely bolted to the lower ends of the ladder-timbers F. This method of securing the ladder-timbers gives strength to the ladder.

In the ordinary dredgers of this kind the ladder F is supported by trusses, and its inclination varied by power applied to its lower end. As the ladder with all its parts is very heavy this plan is not a good one. My improvement in this respect is as follows: Pivoted to the sides of the ladder-timbers F are the bails K, extending in front of the ladder, and having attached to them the vertical pulleys L.

N represents appropriate frame-work or supports carrying pulleys $b$.

O represents the gipsy or windlass upon the boat.

M is the chain, one end of which is attached to the upper bail, K, and passing over the stationary pulleys $b$, and the movable ones, L, over a pulley, $c$, in the vertical frame-work D, down to the windlass O, Fig. 1. By this means an increase of power is obtained, and it is applied evenly upon the ladder to change its inclination when necessary.

Let P represent the series of connected links forming the endless chains passing over the tumblers, Figs. 3 and 4. d are the bolts or pivots securing the links together. Every alternate link is of a single piece, every other one of two pieces, as shown in Fig. 4.

Q represents the buckets, of a shape flaring toward the mouth, the upper lip being cut away to allow the lower one to project for the purpose of throwing the mud directly within the hopper, as shown hereinafter. These buckets are longer than one length of link in the endless chain P, and are wider than the said chains, so that when set thereon they extend over the length of the single link and cover a portion of the double links in front and behind, as shown in Figs. 4 and 3. This protects the joints of the links in passing over the tumblers. The sides of these buckets project over both sides of the chain P, as shown in Fig. 4. This protects the tumblers, because the buckets are high enough to pass over the edges of said tumblers, and prevents any undue strain upon the lower tumbler by forcing it against the bank. Within the buckets Q are the braces w, bolted through flanges on their ends to the upper and lower walls. They consist of a strong metal bar, and serve to prevent the bucket from bulging.

In order to facilitate and support the chain P in passing over the ladder, I place rollers $a'$, Fig. 13, journaled to the ladder-timbers F, and allow the chain to rest upon them, and thus be rolled forward. To the inner sides of the single links of the chains P are bolted the strips of angle-iron R, the upper sides of which extend inwardly, as shown. The buckets Q are bolted down to these angle-iron strips, which form a stable and firm support, and do not interfere with the turning of the links.

Let J represent the tumblers, the one above keyed to the shaft G, and the one below loose upon a shaft journaled in the nose-pieces of the ladder-timbers, both being of ordinary form, as shown, having their ends e and flanges for receiving the chains. I may have the lower tumbler five-sided, if desirable. The chains P in passing around said tumblers are apt to strike and rub their joint-bolts d against the ends e. To obviate this and protect both tumblers and joints, I have beveled or cut away the sharp corners and edges of said ends e, as shown at g in Figs. 4 and 11.

Let S represent the spout or discharge-pipe, supported by appropriate means from the top of the vertical or main frame D, and adjusted to vary its inclination by means of the boom T and suitable cords or chains connected with the power. This pipe extends out toward the bank to any desired distance. It has an elbow, h, on its inner end, as shown, and is provided with the hopper U, placed in position to receive the contents of the elevating-buckets as they pass over the upper tumbler, J. The edge or lip of this hopper toward the approaching buckets is cut away lower than the surrounding edge, Fig. 7. This is for the purpose of better receiving the projecting under lip of said buckets and insuring their discharge directly within the hopper without spilling any of their contents.

The boat A is anchored in the ordinary manner by spuds, which permit its necessary turning to present its dredging-ladder over the extent of the mud-bank. In swinging thus it is necessary to keep the spout or pipe S in about the same position to complete the embankment being formed by its contents. This is for the purpose of being able to place the mud where desired. In order to allow the pipe to extend in proper position and still permit the boat to swing with or without the pipe, as desired, I have connected it with the hopper U by a swivel-joint, as follows: The lower edge of the hopper is cast with or riveted to a projecting flange, i, as shown, Figs. 6 and 15. The upper edge of the elbow h is provided with an outwardly-extending rim, l, turned up at right angles. Upon this rim the flange i of the hopper rests. A plate, m, made in two pieces, is then laid upon the flange i and the upturned end of the rim l, and is secured by bolts, as shown, serving to tighten and secure it. The hopper is thus permitted to turn, while the spout remains stationary.

V represents a bar or bars extending across the opening of the spout. Its purpose is to break or cut the large clods which may be raised by the buckets and thrown into the hopper. The depth of the hopper will cause these clods in falling to acquire sufficient momentum to break themselves upon the cross-bars V. The reason for breaking the clods is to keep the pipe from clogging. The elbow h of the pipe S is further supported by resting on the pivot-pin n in the step o below, Fig. 6, said step being properly supported upon the frame-timbers. This lightens up the weight of the spout.

W represents a horizontal circular platform upon the frame-work, upon which run the wheels X under the spout, assisting in allowing the boat, with the hopper U, to turn without turning said spout. In the upper side of the spout S, near the elbow, is the opening Y, having a covering door or lid, as shown. This is to introduce water into the spout when necessary to flood it for cleansing purposes.

The operation of the machine is that of ordinary dredges of this description: The ladder F is lowered between the channels in the boat to the required depth, the bails K giving an equal tension over its whole length, and the nose-pieces or irons securely holding and strengthening the ladder-timbers and forming above an easy journal for their arc of revolution. The buckets Q are firmly secured to the links by means of the angle-iron strips R, and on account of the length and width of said buckets the links and tumblers are protected. As the buckets pass down to and under the lower tumbler, J, their projecting under lip digs into the mud, and on arriving at the hopper U above project well into the hopper on the side which is cut away, and thus discharge their contents without spilling any.

By cutting away the edges of the tumblers, as described, the joint pins or bolts of the link do not scrape against them and suffer or do damage.

The swivel-joint and the supports, with the track W, permit the spout S to remain in position, as explained, and allow the hopper U to swing about with the boat.

In my description of the ladder-timbers F, I have shown them as consisting of single pieces. While this would be well for a short ladder the weight would be too great for a long one when working in deep water. In order to obtain the requisite length of ladder and still relieve the chains of some of the weight, I have found it preferable to make the ladder in two portions and connect them with a joint or hinge. This improvement I show in Figs. 13 and 16. The side timbers, F, are jointed or hinged at about or below their middle, as shown at c'. The upper portion of the ladder is supported by a separate set of chains and pulleys from those which support the lower, thus allowing the lower part to be raised or lowered, as required, without moving the entire ladder. The upper part may be supported entirely by its chains or by a cross-beam on the frame-work. Thus the upper portion may remain steady and the lower part be made to accommodate itself to various inclinations.

I am aware that an endless chain for dredgers has been composed of alternate single and double links carrying buckets wider than such chain and longer than any single link, and I do not broadly claim such construction.

I am aware of the patents of Lasher, granted respectively May 12, 1874, and March 30, 1875, and therefore do not broadly claim a sectional conveyer or ladder.

Having thus described my invention, what I claim as new, and desire to secure by Letters Patent, is—

1. In a dredging-machine, the combination of the ladder-timbers F with the shaft G, the sleeve t, and nose-pieces H, having the socket a.

2. In a dredging-machine having a ladder, F, the bails K, attached at intervals to said ladder, in combination with hoisting mechanism, substantially as and for the purpose herein described.

3. In a dredging-machine having a ladder, F, and endless carrying-chains P, composed of successive links, the buckets Q, of length greater than any one link, and of width greater than the space occupied by the whole chain P, said buckets having their upper forward lip cut away and their under lip projecting, and being braced by the supports W, substantially as and for the purpose and uses herein described.

4. In a dredging-machine having a ladder, F, and endless chains P, composed of successive links jointed by pins or bolts d, the tumblers J, having the inner surfaces or edges of their ends e cut away, as shown at g, substantially as and for the purpose herein described.

5. In a dredging-machine having a ladder, F, tumblers J, endless chains P, and buckets Q, the hopper U, having one of its lips cut away, in combination with the spout or pipe S, having an elbow, h, said pipe being connected with the hopper by a swivel-joint, and supported by the pivot-pin n in the step O, and by the boom T, with appropriate ropes or guys, substantially as and for the uses and purposes herein described.

6. In a dredging-machine, the combination of a spout or pipe, S, having small wheels X, the hopper U, said pipe and hopper being connected by a swivel-joint, and the circular track W, substantially as and for the purpose herein described.

7. In a dredging-machine, the ladder F, made in two sections, suspended from the top of the frame on journals in the upper end of the upper section thereof, the lower section being hinged to the lower end of the upper, in combination with the endless chain carrying the buckets Q, and with the appropriate frame-work N and chains M, and pulleys b b, whereby the sections of the ladder carrying the buckets are independently moved, as set forth.

In witness whereof I have hereunto set my hand.

H. B. ANGELL.

Witnesses:
JOHN W. BROWN,
C. F. MOULTHROP.